United States Patent [19]
Rauh et al.

[11] Patent Number: 4,889,414
[45] Date of Patent: Dec. 26, 1989

[54] LIGHT MODULATING DEVICE

[75] Inventors: R. David Rauh, Newton; Ronald B. Goldner, Lexington, both of Mass.

[73] Assignee: EIC Laboratories, Inc., Norwood, Mass.

[21] Appl. No.: 779,872

[22] Filed: Sep. 25, 1985

Related U.S. Application Data

[63] Continuation-in-part of Ser. No. 642,956, Aug. 21, 1984.

[51] Int. Cl.$^4$ ............................ G02F 5/23; G02B 1/01
[52] U.S. Cl. .................................... 350/357; 350/355
[58] Field of Search ................. 350/357, 355; 252/600

[56] References Cited

U.S. PATENT DOCUMENTS

| | | | |
|---|---|---|---|
| 3,843,232 | 10/1974 | Berets | 350/160 R |
| 4,006,966 | 2/1977 | Meyers | 350/160 R |
| 4,009,935 | 3/1977 | Faughnan | 350/160 |
| 4,060,311 | 11/1977 | Green | 350/160 R |
| 4,068,928 | 1/1978 | Meyers | 350/160 R |
| 4,096,087 | 6/1978 | Biandin | 252/300 |
| 4,106,862 | 8/1970 | Bayard | 350/357 |
| 4,150,879 | 4/1978 | Bayard | 350/357 |
| 4,163,982 | 8/1979 | DiDomenico, Jr. et al. | 357/2 |
| 4,170,406 | 10/1979 | Giglia et al. | 350/357 |
| 4,175,837 | 11/1979 | Yano et al. | 350/357 |
| 4,182,551 | 1/1980 | Washida et al. | 350/357 |
| 4,201,454 | 5/1980 | Beni et al. | 350/357 |
| 4,225,216 | 9/1980 | Boyd et al. | 350/357 |
| 4,240,713 | 12/1980 | Leibowitz | 350/357 |
| 4,253,742 | 3/1981 | Morita | 350/357 |
| 4,256,379 | 3/1981 | Green | 350/357 |
| 4,282,272 | 8/1981 | Matsuhiro | 427/126.3 |
| 4,294,520 | 10/1981 | Inoue et al. | 350/357 |
| 4,306,773 | 12/1981 | Arnoldussen | 350/357 |
| 4,312,929 | 1/1982 | Randin | 429/188 |
| 4,325,611 | 4/1982 | Huggins | 350/357 |
| 4,338,000 | 7/1982 | Kamimori et al. | 350/357 |
| 4,340,278 | 7/1982 | Beni et al. | 350/357 |
| 4,344,674 | 8/1982 | Giglia | 350/357 |
| 4,347,265 | 8/1982 | Washo | 427/108 |
| 4,350,414 | 9/1982 | Takahashi et al. | 350/357 |
| 4,361,385 | 11/1982 | Huang et al. | 350/357 |
| 4,367,267 | 1/1983 | Oi | 429/101 |
| 4,613,211 | 9/1986 | Papir et al. | 350/357 |

OTHER PUBLICATIONS

Ozaki et al. "Electrochromism in tungsten (VI) oxide evaporated films" Chemical Abstracts vol. 95, 1981.
Goldner et al. "Recent research related to the development of electrochromic windows" Chemical Abstracts, vol. 104, 1986.
Romanov et al. "Changes in the properties of electrochromic films due to laser radiation pulses" Chemical Abstracts vol. 103, 1985.
Rauh, Passive and Hybrid Solar Energy Update Meeting Proceedings, Sep., 1982.
Goldner, Appl. Phys. Lett., 43,1093 (1982).
Goldner, SPIE, 428, 38 (1983).
Shizukuishi, Jpn. J. Appl. Phys., 19, 2121 (1980).
Green, Thin Solid Films, 10, 119 (1977).
Lampert, "Thin Film Electrochromic Materials for Energy Efficient Windows", Lawrence Berkely Laboratory Report, LBL-10862, U.C. Berkeley (Oct., 1980).
Lampert, "Durable, Innovative Solar Optical Materials–The International Challenge", Lawrence Berkeley Report LBL-13753, U.C. Berkeley (Jan. 1982).
Schirmer, J. Electrochem. Soc., 124, 749 (1977).
Kanai, J. Electrochem. Soc., 129, 2633 (1982).
Miyake, J. Appl. Phys. 53 (3), 1511 (1982).
Kaneko, J. Appl. Phys. 53 (6), 4416 (1982).

*Primary Examiner*—Eugene R. LaRoche
*Assistant Examiner*—Michael Shingleton
*Attorney, Agent, or Firm*—Fish & Richardson

[57] ABSTRACT

In a device for transmitting light, means for controlling the transmissivity of the device, including a ceramic, reversibly electrochromic, crystalline element having a highly reflective state when injected with electrons and charge compensating ions and a highly transmissive state when the electrons and ions are removed, the crystalline element being characterized as having a reflectivity of at least 50% in the reflective state and not greater than 10% in the transmissive state, and means for modulating the crystalline element between the reflective and transmissive states by injecting ions into the crystalline element in response to an applied electrical current of a first polarity and removing the ions in response to an applied electrical current of a second polarity.

27 Claims, 1 Drawing Sheet

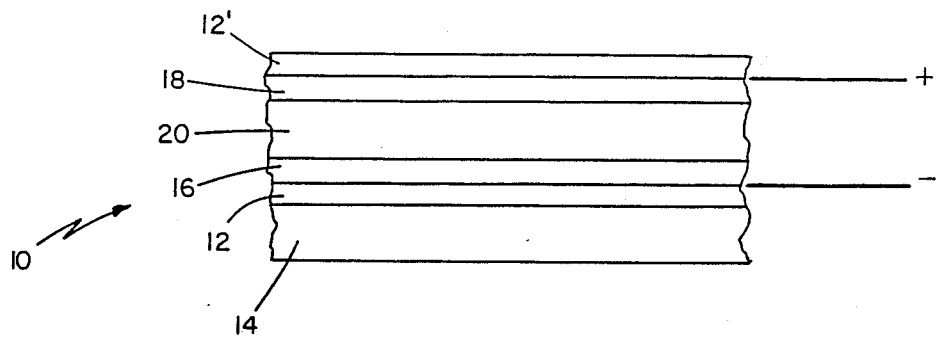

LIGHT MODULATING DEVICE

This invention was made with Government support under Contract No, DE-AC03-82CE30746 awarded by the Department of Energy. The Government has certain rights in this invention.

BACKGROUND OF THE INVENTION

This application is a continuation-in-part of Rauh et al., co-pending U.S. patent application Ser. No. 642,956 filed Aug. 21, 1984.

This invention relates to modulating light transmissivity, for example, in building windows.

Light tranmissivity can be varied by modulating absorption. Devices employing electrochromic materials have been used for this purpose. Electrochromic materials are substances whose optical properties can be reversibly altered through application of an electric current in a process involving the simultaneous injection or extraction of electrons and charge compensating ions. This process is accompanied by the formation of an absorption band which results in a change in the transmissivity.

It has also been recognized that light transmissivity can be varied by modulating reflectivity. Suitable materials must be capable of being reversibly switched between a metal-like, reflective state and an optically transmissive state. Early efforts to use crystalline $WO_3$, deposited by rf sputtering, in a reflective mode are described in Rauh, Passive and Hybrid Solar Energy Update Meeting Proceedings, September 1982.

SUMMARY OF THE INVENTION

In general, the invention features means for selectively controlling the transmissivity of a device for transmitting light, including a ceramic, reversibly electrochromic, crystalline element having a highly reflective state when injected with electrons and charge compensating ions and a highly transmissive state when the electrons and ions are removed, the crystalline element being characterized as having a reflectivity of at least 50% in the reflective state and not greater than 10% in the transmissive state; and means for modulating the crystalline element between the reflective and transmissive states by injecting ions into the crystalline element in response to an applied electrical current of a first polarity and removing the ions in response to an applied electrical current of a second polarity.

In preferred embodiments, the crystalline element exhibits a sufficient degree of crystalline order, has a chemical composition sufficiently close to stoichiometric, and is sufficiently free of defects, so as to ensure reflectivity of at least 50% when the crystalline element is injected with electrons and charge compensating ions; the orientation of the highest mobility crystallite faces of the crystalline element is sufficiently uniform and transverse to the incident light beam to ensure reflectivity of at least 50% when the crystalline element is injected with electrons and charge compensating ions; the chemical composition of the crystalline element is $WO_x$, where X is between 2.8 and 3, inclusive; the modulating means is a ceramic element, preferably an amorphous, weakly electrochromic compound capable of cathodically injecting ions into the crystalline element, e.g., $Nb_2O_5$, or an amorphous, reversibly electrochromic compound capable of anodically injecting ions into the crystalline element, e.g., $IrO_2$; the device further includes an electrically insulating element capable of conducting ions between the crystalline element and the modulating means, e.g., $LiAlF_4$; the modulating means forms an outermost portion of the device; the crystalline element forms an outermost portion of the device; the modulating means and the crystalline element each form a separate outermost portion of the device; the device further includes means for supplying electrical currents of first and second polarities; the device is deposited on a transparent substrate or sandwiched between two such substrates; and the crystalline element and the modulating means are substantially continuous films. The device also further includes a first transparent electrode in contact with the crystalline element and a second transparent electrode in contact with the modulating means. Preferred electrode materials include $SnO_{2-x}$ or $SnO_{2-x}$ doped with Sb, F, or In, where X is between 0 and 0.3, inclusive; $In_2O_{3-x}$ or $In_2O_{3-x}$ doped with Sn, F, or Cd, where X is between 0 and 0.3, inclusive; $In_2O_{3-x}/SnO_{2-x}$ alloys doped with Sn, Sb, F, In, or Cd, where X is between 0 and 0.3, inclusive; or glass substrates coated with these materials. These electrode materials are also suitable for the modulating means, in which case the modulating means preferably forms an outermost portion of the device; the crystalline element can also form a separate outermost portion of this device.

The crystalline element is made by sputtering a compound onto a heated substrate, the temperature of the substrate being sufficient to cause crystallization of the compound as deposited in substantially oriented and ordered form, from a sputtering target including the compound to be deposited, the sputtering being conducted by means of a radio frequency plasma, where the plasma power is preferably between 1.7 and 2.2 Watts/$cm^2$, in an atmosphere including an inert gas and a reactive gas capable of being incorporated into the compound as deposited, the reactive gas being present in an amount sufficient to produce the crystalline element in substantially stoichiometric, oriented, and ordered form, the stoichiometry, order and orientation being characterized as sufficient to ensure a reflectivity of at least 50% when the crystalline element is injected with electrons and charge compensating ions. This method is used to produce $WO_x$ where X is between 2.8 and 3, inclusive.

The devices of the invention control light transmissivity by modulating reflectivity. Reflectivity modulation is preferable to absorption modulation because reflective devices require thinner films since reflectivity is not a function of film thickness; the devices of the invention thus consume less energy per charging cycle. In addition, because the reflective devices of the invention absorb a minimum of incoming light, they do not become hot as do absorptive films, thus minimizing thermally induced strains and increasing stability.

Other features and advantages of the invention will be apparent from the following description of the Preferred embodiments thereof, and from the claims.

DESCRIPTION OF THE PREFERRED EMBODIMENT

We first briefly describe the drawing.

The FIGURE is a fragmentary cross-sectional view of an electrochromic device embodying the invention.

STRUCTURE

A reflectivity modulating device employing a ceramic, electrochromic, crystalline element is shown in the FIGURE. (As used herein, the term "ceramic" denotes a nonmetallic inorganic material.) Device 10 has optically transparent electrodes 12 and 12' connected to a conventional dc current source (not shown) and deposited on transparent substrate 14, typically glass; electrode thicknesses are 0.05–0.5 μm, preferably 0.1 μm. Suitable electrode materials are transparent, optically passive, conductive, ceramic materials, including $SnO_{2-x}$, where X is between 0 and 0.3, inclusive; $SnO_{2-x}$ doped with Sb, F, or In; $In_2O_{3-x}$, where X is between 0 and 0.3, inclusive; $In_2O_{3-x}$ doped with Sn, F, or Cd; $In_2O_{3-x}/SnO_{2-x}$ alloys doped with Sn, Sb, F, In, or Cd; and glass substrates coated with these materials, e.g., NESA glass (PPG Industries) and NESATRON (PPG Industries). The most preferred material is Sb doped $SnO_2$, which is deposited by vacuum sputtering.

Electrodes 12 and 12' sandwich ceramic, electrochromic, crystalline layer 16 and ceramic layer 18 capable of reversibly inserting alkali metal or hydrogen ions into layer 16 in response to an applied dc current; layers 16 and 18 are separated by electrically insulating, ion conducting electrolyte 20. With the polarity of electrodes 12 and 12' set up as shown, electrode 12 is the cathode, enabling reduction of layer 16, while electrode 12 is the anode, enabling oxidation of layer 18.

Layer 16 is a ceramic, electrochromic, crystalline film which is highly reflective ($R \geq 50\%$) when injected with electrons and charge compensating ions ("colored state") and highly transmissive ($R \leq 10\%$) when these species are removed ("bleached state"). Reflectivity is enhanced by crystallinity which promotes free electron delocalization within the conduction band of the electrochromic material, resulting in optical and electrical behavior similar to that of a metal. In contrast, amorphous electrochromic films form an absorption band upon injection of electrons and charge compensating ions, rather than becoming reflective, because the injected electrons remain localized.

Examples of suitable materials for layer 16 include metal oxides, e.g., $WO_3$, $MoO_3$, and $Nb_2O_5$; layered compounds having the formula $MX_2$ where X is S or Se and M, independently, is Zr, Hf, V, Nb, Ta, Mo, or W; layered compounds having the formula $MX_3$ where X is S or Se and M, independently, is Ti, Nb, or Mo; layered metal oxyhalides, e.g., FeOCl and $VO_2F_2$; and compounds with channel-type crystal structures having the formula $Mo_3X_4$ where X is S or Se. The most preferred material is $WO_3$.

The thickness of layer 16 is chosen so as to minimize light absorption in both the colored and bleached states of the film. Typical thicknesses are 0.05–5 μm, preferably 0.1 μm.

There appears to be a relationship between the magnitude of the observed reflectivity of crystalline electrochromic materials and the degree of crystalline order displayed by these materials. Crystalline order, as defined herein, refers to the arrangement of the component atoms of a material relative to each other. The maximum degree of order in a crystalline ceramic material exists at absolute zero when these atoms occur in a regular periodic array with respect to each other. Deviations from a state of maximum order arise when thermal defects, e.g., defects induced by atomic vibrations when the temperature is above absolute zero, or structural defects, e.g., extended and point defects introduced during or subsequent to manufacture of the material, are introduced into the crystalline lattice.

It is believed that thermal and structural defects scatter or trap electrons injected into the crystalline material, thus decreasing the mobility of the electrons throughout the crystalline lattice. This decrease results in a concurrent decrease in the reflectivity of the material, which is dependent on the presence of highly mobile charge carriers. Therefore by minimizing the occurrence of these defects (primarily the structural defects since thermal defects will always be present at temperatures above absolute zero), the degree of crystalline order and hence the reflectivity of the material is enhanced.

One way of minimizing structural defects in a crystalline film is to minimize grain boundary defects which occur at crystallite interfaces. This can be achieved by depositing single crystalline films, which have no grain boundary defects, or polycrystalline films having large, and hence fewer crystallites, resulting in fewer grain boundary defects.

Because both single and polycrystalline materials exhibit anisotropic electron transport properties, the orientation of the crystalline material also influences the degree of reflectivity achieved. Preferably, the material is oriented such that the crystallite faces (or face in the case of a single crystalline material) of highest electron mobility are uniformly stacked transverse to the incident light beam. In a polycrystalline film the degree of orientation can be enhanced by depositing the crystalline material under conditions which produce large crystallites.

Another important factor which influences the reflectivity of the crystalline material is its stoichiometry. As used herein, a stoichiometric material is a material in which there is a fixed integral relationship between its component species. It is believed that stoichiometric materials exhibit fewer structural defects and therefore higher charge carrier mobilities, resulting in enhanced reflectivities compared to non-stoichiometric materials. In addition, stoichiometric materials are substantially non-reflective when bleached.

Layer 16 is preferably a single crystalline or polycrystalline film substantially close to stoichiometric and exhibiting a degree of crystalline order and orientation all so as to ensure a reflectivity of $\geq 50\%$.

Films displaying the above-described properties are prepared by radio frequency (rf) sputtering onto a heated substrate using a hot pressed polycrystalline disk of the ceramic compound to be deposited as the sputtering target. The rf power is typically between 1.7 and 2.2 watts/cm². The use of a ceramic compound as the target, rather than using a metallic target containing the metallic component of the ceramic compound to be deposited, ensures the production of substantially stoichiometric films.

The temperature of the substrate, which is monitored throughout film deposition by a thermocouple, is sufficient to cause the as-deposited film to crystallize as a single crystalline film or a polycrystalline film with crystallites large enough to ensure a reflectivity of $\geq 50\%$.

Sputtering is conducted in an atmosphere consisting of an inert gas, preferably Ar, and a reactive gas which is incorporated into the deposited film. Examples of reactive gases include oxygen (to form oxides), hydrogen sulfide (to form sulfides), and hydrogen selenide (to form selenides). The pressure of the reactive gas is sufficient to produce films which are sufficiently close to stoichiometric and sufficiently oriented to ensure reflectivities $\geq 50\%$ when colored.

Film thickness is a function of sputtering time and is monitored throughout film growth using, e.g., a piezoelectric quart crystal placed in the ion path.

Crystalline films of $WO_x$, where X is between 2.8 and 3, inclusive, displaying the above-described properties are prepared by rf sputtering in an R.D. Mathis Model SP430 rf sputtering apparatus using a hot pressed polycrystalline 3.5 inch diameter $WO_3$ disk as the sputtering target; the target is located 5 cm from the substrate on which the film is deposited. The rf power used is 100 watts. Just prior to use, the sputtering chamber is evacuated and then filled with an atmosphere consisting of 90% Ar and 10% $O_2$ such that total chamber pressure equals at least $2 \times 10^{-2}$ torr. At this pressure, films having an oxygen to tungsten ratio of 2.8-3 are produced; lower pressures result in blue, non-stoichiometric, oxygen deficient films.

The sputtered film is deposited on electrode 12, which is resistively heated and maintained between 300°–475° C., preferably 465° C.; the temperature is measured with a Cr-alumel thermocouple bonded to the substrate with high temperature conductive cement. The thickness of the deposited film is monitored during growth by a piezoelectric quartz crystal placed in the ion path (Kronos, Model GM311 with FFP2-200 sensor).

The crystalline $WO_x$ films prepared by this method are polycrystalline films whose crystallites are oriented with their highest mobility faces parallel to the substrate surface and transverse to the incident light beam. They are substantially stoichiometric and defect free such that they exhibit reflectivities of 60–65% when electrochemically reduced. The wavelength at which reflectivity commences is determined by the injected free charge carrier density, which in turn is a function of the applied charge.

Layer 18 forms a redox couple with layer 16 and acts as an ion storage medium for alkali metal or hydrogen ions when device 10 is bleached. It is capable of reversibly injecting alkali metal or hydrogen ions into layer 16 in response to an applied dc current, is preferably substantially non-reflective when reduced ($R \leq 10\%$), and does not absorb significant amounts of sunlight when device 10 is bleached. It must be sufficiently thick to hold enough ions to fully charge layer 16, yet must not be so thick that it displays a significant amount of absorption. Typical thicknesses are 0.114 5.0 $\mu$m, preferably 0.3 $\mu$m.

Layer 18, which is formed by vacuum deposition or sputtering, also contains hydrogen or alkali metal, e.g., lithium, ions which are injected into layer 16 when a dc current is applied to device 10. These ions are incorporated into layer 18 by vacuum evaporation.

Suitable materials for layer 18 include amorphous weakly electrochromic cathodic ion injection compounds, e.g., $TiO_2$, $V_2O_5$, $V_6O_{13}$, $xWO_3 \cdot yMTiO_3$ (M is Ba or Sr), $xWO_3 \cdot yLaAlO_3$, $Ta_2O_5$, and $Nb_2O_5$; amorphous or crystalline nonelectrochromic ion injection compounds, e.g., $Bi_2O_3$, $Bi_2S_3$, $Sb_2O_3$, $Sb_2S_3$, and $PbF_2$; and amorphous or crystalline complementary electrochromic anodic ion injection compounds, e.g., $IrO_2$, $RhO_2$, $RuO_2$, and mixtures thereof, NiO, CoO, and $Cr_2O_3$. The amorphous weakly electrochromic cathodic ion injection compounds are the preferred materials. The most preferred material is amorphous $Nb_2O_5$ which is deposited by rf sputtering from a Nb target in an oxygen rich atmosphere.

Electrolyte 20, which separates layer 16 and layer 18, conducts charge compensating ions between layers 16 and 18. Because it allows ion conduction but not electron conduction or tunneling between these layers, it prevents device 10 from short-circuiting when the applied current is removed. Typical thicknesses of this layer, which is usually formed by vacuum evaporation or sputtering, are 0.1–5.0 $\mu$m, preferably 1.0 $\mu$m.

Suitable materials for electrolyte 20, which is preferably solid, include $MAlX_4$ where M is Li or Na and X, independently, is Cl or F, or mixtures thereof; $A_2O \cdot nM_2O_3$ where A is Li, Na, or Ag; M, independently, is Al or Ga; and n is an integer from 5-11, or mixtures thereof; and alkali glasses, e.g., $LiAlSiO_4$, $LiPO_3$, and $xM_2O \cdot ySiO_2$, where M is Li or Na. The most preferred compound is $LiAlF_4$, a clear, amorphous, chemically inert compound which is deposited by evaporation from a $LiF/AlF_3$ eutectic melt.

USE

When the current source connected to electrodes 12 and 12' is turned on, electrons are supplied to layer 16 through cathodic electrode 12, while charge compensating alkali metal or hydrogen ions are simultaneously injected from film 18 via electrolyte 20, forming reflective ion injection compounds by reduction of layer 16; oxidation of layer 18 occurs concurrently at anodic electrode 12'. Because electrolyte 20 is electrically insulating, layer 16 remains reduced and reflective after the current source is turned off; therefore, current need not be continuously applied.

If the polarity of electrodes 12 and 12' is now reversed, layer 16 oxidizes and bleaches, and the injected alkali metal or hydrogen ions now reinject into layer 18; in this state device 10 is optically transmissive.

The wavelength at which device 10 becomes reflective is modulated by adjusting the input charge, which is accomplished by adjusting the magnitude of the applied current or the time for which that current is applied. Therefore, device 10 can act as a tunable heat mirror when incorporated into a window or solar panel for a building. On hot summer days, for example, device 10 can be adjusted to transmit a minimum of visible light, while reflecting infrared light (heat); at night it can be adjusted such that both visible and infrared light are transmitted, thus promoting radiational cooling. In contrast, on cold winter days maximum visible transmission and infrared reflectivity are desired to warm the building, while at night both infrared and visible light are reflected to minimize heat loss.

In addition to being used as energy efficient windows and panels for controlling the amount of light transmitted through buildings, the light modulating devices of the invention can be incorporated in optical communications and infrared imaging devices, photographic equipment, e.g., camera shutters and lens diaphragms, and display overlays. By eliminating ion conducting layer 20, they can also be used for high frequency (>1 Hz) ac light modulation under the excitation of an ac electrical current.

Other details of the invention are described in the following publications, hereby incorporated by reference: Goldner et al., Appl. Phys. Lett., 43, 1093 (1983); and Goldner et al., SPIE, 428, 38 (1983).

Other embodiments are within the following claims.

E.g., electrodes 12 and 12' may be omitted and layers 16 and 18 attached directly to the current source since these layers exhibit enough electrical conductivity to be used as electrodes.

Also, layer 20 can be a semi-solid, rather than a solid, electrolyte, e.g., a sulfonic polymer or copolymer. The functions of layers 18 and 20 can also be combined into one layer by using an alkali ion conducting organic polymer embedded with alkali metal ions, e.g., polyethylene oxide-nLiX, where X is I, SCN, or $BF_4$ and n is an integer. Both of the above-described electrolytes can be adhesively bonded to layer 16.

It is also possible to initially inject charge compensating ions into layer 16, rather than layer 18. This is accomplished by evaporating these ions onto layer 16 prepared as described earlier.

Layers 16 and 18 can be the same crystalline material but of different thickness; as ions are moved from one layer to another, the variation in ion concentration is greater in the thinner layer than in the thicker layer, as is the variation in the reflectivity edge.

Layers 16 and 18 can also be of the same crystalline material and thickness; the wavelength at which reflectivity commences is determined by the concentration of injected ions. The film is transmissive when the concentration of injected ions is the same in both layers.

A second transparent substrate, e.g., glass, can be used such that device 10 is sandwiched between two transparent substrates.

Because reflective layer 16 can also absorb light when injected with electrons and charge compensating ions, device 10 can also be used for simultaneous absorption and reflection modulation.

Layer 18 can be omitted and its function carried out by layer 12, thus forming a 4-layer device, because layer 12 (e.g., when made from the preferred electrode materials described above) can also store alkali metal or hydrogen ions, and can inject these ions into layer 16 in response to an applied dc current. As already indicated, layer 12 can also be omitted, thus forming a 3-layer device.

We claim:

1. A device for transmitting light comprising means for controlling the transmissivity of said device, said transmissivity controlling means comprising
   (a) a ceramic, reversibly electrochromic, crystalline element having a highly reflective state when injected with electrons and charge compensating ions and a highly transmissive state when said electrons and said ions are removed, said crystalline element being characterized as having a reflectivity of at least 50% in said reflective state and not greater than 10% in said transmissive state, and
   (b) means for modulating said crystalline element between said reflective and said transmissive states by injecting ions into said crystalline element in response to an applied electrical current of a first polarity and removing said ions in response to an applied electrical current of a second polarity.

2. The device of claim 1 wherein said crystalline element is so characterized by exhibiting a degree of crystalline order, sufficient to ensure said reflectivity of at least 50% when said crystalline element is injected with said electrons and said charge compensating ions.

3. The device of claim 1 wherein said crystalline element is so characterized by being sufficiently free of crystalline defects to ensure said reflectivity of at least 50% when said crystalline element is injected with said electrons and said charge compensating ions.

4. The device of claim 1 wherein the orientation of the highest mobility crystallite faces of said crystalline element is characterized as being sufficiently uniform and transverse to the incident light beam to ensure said reflectivity of at least 50% when said crystalline element is injected with said electrons and said charge compensating ions.

5. The device of claim 1 wherein the chemical composition of said crystalline element is so characterized by being sufficiently close to stoichiometric to ensure said reflectivity of at least 50% when said crystalline element is injected with said electrons and said charge compensating ions.

6. The device of claim 5 wherein said chemical composition of said crystalline element is $WO_x$.

7. The device of claim 5 wherein X is between 2.8 and 3, inclusive.

8. The device of claim 1 wherein said modulating means is a ceramic element.

9. The device of claim 8 wherein said ceramic element is an amorphous, reversibly electrochromic compound capable of anodically injecting ions.

10. The device of claim 9 wherein said ceramic element is $IrO_2$.

11. The device of claim 8 wherein said ceramic element is an amorphous, weakly electrochromic compound capable of cathodically injecting ions.

12. The device of claim 11 wherein said ceramic element is $Nb_2O_5$.

13. The device of claim 1 wherein said modulating means is chosen from the group consisting of $SnO_{2-x}$; $SnO_{2-x}$ doped with Sb, F, or In; $In_2O_{3-x}$; $In_2O_{3-x}$ doped with Sn, F, or Cd; $In_2O_{3-x}/SnO_{2-x}$ alloys doped with Sn, Sb, F, In, or Cd; and glass substrates coated with said $SnO_{2-x}$, said doped $SnO_{2-x}$, said $In_2O_{3-x}$, said doped $In_2O_{3-x}$, or said doped $In_2O_{3-x}/SnO_{2-x}$ alloys.

14. The device of claim 1 further comprising an electrically insulating element capable of conducting ions between said crystalline element and said modulating means.

15. The device of claims 1 or 13 wherein said modulating means forms an outermost portion of said device.

16. The device of claim 1 wherein said crystalline element forms an outermost portion of said device.

17. The device of claims 1 or 13 wherein said modulating means and said crystalline element each form a separate outermost portion of said device.

18. The device of claim 14 wherein said electrically insulating element is $LiAlF_4$.

19. The device of claim 1 further comprising means for applying said electrical currents of first and second polarities.

20. The device of claim 1 further comprising a first transparent electrode in contact with said crystalline element and a second transparent electrode in contact with said modulating means.

21. The device of claim 20 wherein said first transparent electrode and said second transparent electrode, independently, are chosen from the group consisting of $SnO_{2-x}$; $SnO_{2-x}$ doped with Sb, F, or In; $In_2O_{3-x}$; $In_2O_{3-x}$ doped with Sn, F, or Cd; $In_2O_{3-x}$ $SnO_{2-x}$ alloys doped with Sn, Sb, F, In, or Cd; and glass substrates coated with said $SnO_{2-x}$, said doped $SnO_{2-x}$, said $In_2O_{3-x}$, said doped $In_2O_{3-x}$, or said doped $In_2O_{3-x}/SnO_{2-x}$ alloys.

22. The device of claim 1 wherein said device is deposited on a transparent substrate.

23. The device of claim 1 wherein said device is sandwiched between two transparent substrates.

24. The device of claim 1 wherein said crystalline element and said modulating means are substantially continuous films.

25. A method for producing a ceramic, reversibly electrochromic, crystalline element having a highly reflective state when injected with electrons and charge compensating ions and a highly transmissive state when said electrons and said ions are removed, said crystalline element being characterized as having a reflectivity of at least 50% in said reflective state and not greater than 10% in said transmissive state, said method comprising the steps of sputtering a compound onto a heated substrate, the temperature of said substrate being sufficient to cause crystallization of said compound as deposited in substantially oriented and ordered form, from a sputtering target comprising said compound to be deposited, said sputtering being conducted by means of a radio frequency plasma in an atmosphere comprising an inert gas and a reactive gas capable of being incorporated into said compound as deposited, said reactive gas being present in an amount sufficient to produce said crystalline element in substantially stoichiometric, oriented, and ordered form, wherein said stoichiometry, said order, and said orientation are so characterized by being sufficient to ensure a reflectivity of at least 50% when said crystalline element is injected with electrons and charge compensating ions.

26. The method of claim 25 wherein the chemical composition of said crystalline element is $WO_x$ where X is between 2.8 and 3, inclusive.

27. The method of claim 25 wherein the power of said radio frequency plasma is between 1.7 and 2.2 watts/cm$^2$.

* * * * *